(12) United States Patent
Benammar et al.

(10) Patent No.: US 10,321,356 B2
(45) Date of Patent: Jun. 11, 2019

(54) SYSTEM AND METHOD FOR PERFORMING RETRANSMISSION OF A PACKET

(71) Applicants: Nassir Benammar, Rockville, MD (US); Channasandra Ravishankar, Clarksburg, MD (US)

(72) Inventors: Nassir Benammar, Rockville, MD (US); Channasandra Ravishankar, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/722,827

(22) Filed: Oct. 2, 2017

(65) Prior Publication Data

US 2018/0352471 A1 Dec. 6, 2018

Related U.S. Application Data

(60) Provisional application No. 62/514,458, filed on Jun. 2, 2017.

(51) Int. Cl.
*H04W 28/02* (2009.01)
*H04W 28/04* (2009.01)
*H04L 1/18* (2006.01)
*H04L 1/00* (2006.01)

(52) U.S. Cl.
CPC ....... *H04W 28/0289* (2013.01); *H04L 1/0031* (2013.01); *H04L 1/1887* (2013.01); *H04W 28/04* (2013.01)

(58) Field of Classification Search
CPC .............. H04W 28/0289; H04W 28/04; H04L 1/1887; H04L 1/0031
See application file for complete search history.

(56) References Cited

U.S. PATENT DOCUMENTS

| 2010/0195519 A1* | 8/2010 | Ji | H04L 1/187 370/252 |
| 2015/0296059 A1* | 10/2015 | Karri | H04L 69/324 370/329 |
| 2017/0171060 A1* | 6/2017 | Liu | H04L 5/0007 |

(Continued)

FOREIGN PATENT DOCUMENTS

WO 2014176034 A1 10/2014

OTHER PUBLICATIONS

3GPP 23.203: "Policy and charging control architecture", 2010.

(Continued)

*Primary Examiner* — Omar J Ghowrwal
(74) *Attorney, Agent, or Firm* — Capitol City TechLaw; Jasbir Singh

(57) ABSTRACT

A method for reducing retransmission of packets by a sender is disclosed. The method includes: providing a network comprising a physical layer, a medium access control (MAC) layer and an Radio Link Control (RLC) layer; providing a retransmission packet in the physical layer, wherein the retransmission packet comprises a flow having a reordering feature in the RLC layer; enabling Hybrid Automatic Repeat reQuest (HARQ) in the physical layer and the MAC layer; receiving a HARQ request for a retransmission; and transmitting a new packet with the physical layer in response to the HARQ request, when the reordering feature for the flow in the retransmission packet is disabled.

14 Claims, 4 Drawing Sheets

(56) References Cited

U.S. PATENT DOCUMENTS

| | | | |
|---|---|---|---|
| 2018/0049270 A1* | 2/2018 | Kubota | H04W 76/28 |
| 2018/0077605 A1* | 3/2018 | Maheshwari | H04L 69/321 |
| 2018/0139011 A1* | 5/2018 | Chae | H04B 7/26 |
| 2018/0227087 A1* | 8/2018 | Deng | H04L 1/1822 |

OTHER PUBLICATIONS

3GPP 36.212 Evolved Universal Terrestrial Radio Access (E-UTRA); Multiplexing and channel coding, 2010.
3GPP 36.322 Evolved Universal Terrestrial Radio Access (E-UTRA); Radio Link Control (RLC); 2010.
3GPP 36.331 Evolved Universal Terrestrial Radio Access (E-UTRA); Radio Resource Control (RRC); 2010.
LTE—The UMTS Long Term Evolution: From Theory to Practice, 2nd Edition, Mathew Baker, 2010, pp. 365, 366, 369 and 370.
International search report from corresponding PCT application No. PCT/US2018/035362.
Sequans Communications: "Disabling of PDCP reordering", 3GPP Draft; R2-1705776 Disabling of PDCP Reordering, 3rd Generation Partnership Project (3GPP), Mobile Competence Centre; 650, Route des Lucioles ; F-06921 Sophia-Antipolis Cedex ; France, vol. RAN WG2, No. Hangzhou, China; May 15, 2017-May 19, 2017 May 14, 2017 (May 14, 2017), XP051276062, Retrieved from the Internet: URL:http://www.3gpp.org/ftp/Meetings_3GPP_SYNC/RAN2/Docs/ [retrieved on May 14, 2017].

* cited by examiner

SYSTEM AND METHOD FOR PERFORMING RETRANSMISSION OF A PACKET

CROSS-REFERENCE TO RELATED APPLICATIONS

The present application claims the benefit of U.S. Provisional Application No. 62/514,458 filed Jun. 2, 2017, which is incorporated herein by reference.

FIELD

The present teachings disclose a method for reducing or eliminating unnecessary retransmission of packets expected to be dropped by a receiving side at the Radio Link Control (RLC) layer due to latency constraints associated with the flow, in particular, a system providing packet services over a satellite communications system. The present teachings also apply to a Long Term Evolution (LTE) system or other configurations that result in an unacceptable delay due to retransmission.

BACKGROUND

In the prior art, a Radio Link Control (RLC) Unacknowledged (UNACK) Mode allows for some packet losses for delay sensitive flows. In RLC Unacknowledged Mode for a Fourth Generation Long Term Evolution (4G-LTE) based system where Hybrid Automatic Repeat reQuest (HARQ) is deployed and a packet loss is detected, the RLC waits for the packet to be recovered by HARQ before trying to reassemble subsequent RLC packets and pass them up to a higher layer. The packet recovery is delegated to the physical layer using HARQ. The physical layer, using HARQ, is able to indicate to the sender that a burst was not successfully received and consequently the sender may retransmit. The retransmission is then combined with the initial transmission before decoding.

The LTE standards of note can be found in the references listed below, all of which are incorporated herein in their entireties by reference.
 [1] 3GPP 36.331 Evolved Universal Terrestrial Radio Access (E-UTRA); Radio Resource Control (RRC).
 [2] 3GPP 36.322 Evolved Universal Terrestrial Radio Access (E-UTRA); Radio Link Control (RLC).
 [3] LTE—The UMTS Long Term Evolution: From Theory to Practice, 2nd Edition.
 [4] 3GPP 23.203: "Policy and charging control architecture".
 [5] 3GPP 36.212 Evolved Universal Terrestrial Radio Access (E-UTRA); Multiplexing and channel coding.

HARQ improves link reliability when a packet is retransmitted. This is especially beneficial for data traffic requiring low rates of packet loss (for example, a Transmission Control Protocol (TCP) flow). However, when HARQ is used for a delay sensitive flow, HARQ results in a long end-to-end delay, for example, poor voice quality, jitter or the like. In exemplary embodiments, a data bearer may have a high retransmission Round Trip Time (RTT), for example, a radio data bearer or the like. The high retransmission RTT may be a consequence of bearer media or distances traveled over the bearer, for example, when using a Low Earth Orbit (LEO), Medium Earth Orbit (MEO), or Geosynchronous Earth Orbit (GEO) satellite link, or the like. An acceptable delay may be defined by an application, for example, an acceptable delay may be a different value for voice communications as compared to data communications.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A method for reducing retransmission of packets by a sender is disclosed. The method includes: providing a network including a physical layer, a medium access control (MAC) layer and an Radio Link Control (RLC) layer; providing a retransmission packet in the physical layer, wherein the retransmission packet includes a flow having a reordering feature in the RLC layer; enabling Hybrid Automatic Repeat reQuest (HARQ) in the physical layer and the MAC layer; receiving a HARQ request for a retransmission; and transmitting a new packet with the physical layer in response to the HARQ request, when the reordering feature for the flow in the retransmission packet is disabled.

A system to reduce retransmission of packets by a sender is disclosed. The system includes: a network comprising a physical layer, a medium access control (MAC) layer, a sender, and a receiver, wherein the receiver includes a Radio Link Control (RLC) layer; and a retransmission packet in the physical layer, wherein the retransmission packet includes a flow having a reordering feature in the RLC layer. In the system, a Hybrid Automatic Repeat reQuest (HARQ) is enabled in the physical layer and the MAC layer, a HARQ request for a retransmission is received by the sender, and the sender sends a new packet with the physical layer in response to the HARQ request, when the reordering feature for the flow in the retransmission packet is disabled.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be considered to be limiting of its scope, implementations will be described and explained with additional specificity and detail through the use of the accompanying drawings.

Figure 1:
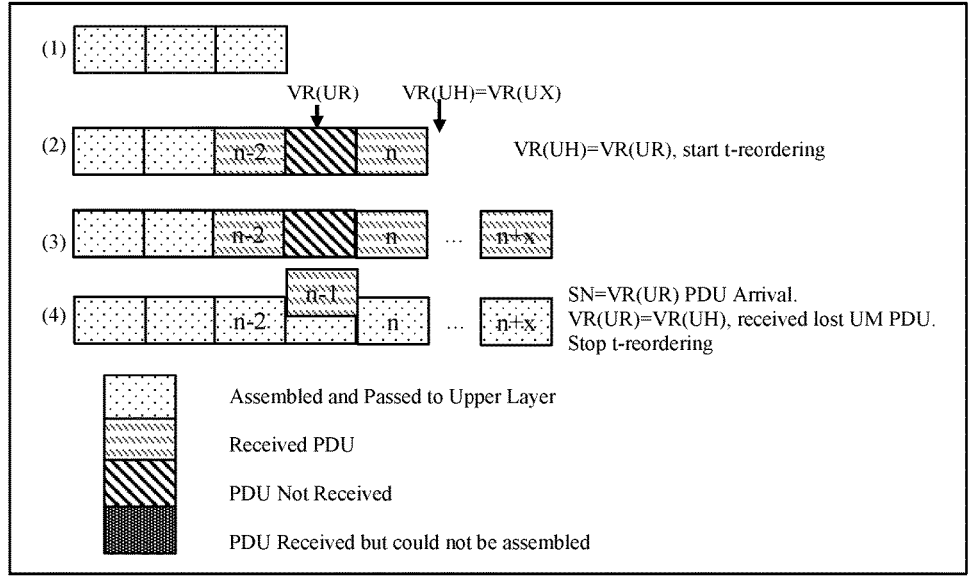
FIG. 1 and FIG. 2 illustrate different state variables per the 3rd Generation Partnership Project (3GPP) specification for a Radio Link Control (RLC) layer Unacknowledged mode.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings improve on the method described in the Long Term Evolution (LTE) specification and satellite communication systems that borrow from LTE with respect to Quality of Service (QoS) requirements, a Radio Link Control (RLC) layer and Hybrid Automatic Repeat reQuest (HARQ). In such a system, there needs to be special treatment of radio bearers (for example, packet flows) that are delay and jitter sensitive, such as, radio bearers with a QoS Class Identifier (QCI) set as one (1) for carrying Voice over Internet Protocol (VoIP) traffic or the like.

Due to a delay associated with the transmission in a satellite communication system, for example, Low Earth Orbit (LEO), Medium Earth Orbit (MEO), Geosynchronous Earth Orbit (GEO), or High Altitude Platform (HAP), the Unacknowledged (UNACK) Mode RLC may be configured such that a t-reordering time window may be turned off, for example, by setting the associated parameter to a value of zero (0) per reference [2]. When the t-reordering time is set to 0 and a packet loss is detected, the RLC should not wait for the physical layer to recover from the packet loss per reference [2]. As such, by setting the t-reordering time to zero, the reordering feature is disabled. Furthermore, the RLC should process or reassemble any subsequent RLC blocks immediately. When a packet is recovered by the Physical layer and passed to the RLC layer, the packet is dropped by the RLC layer as the packet's associated sequence number falls outside of the reordering feature when the subsequent packets are received.

In the above-described RLC configuration, the HARQ retransmission packet will be dropped or may result in unwanted jitter if subsequent RLC blocks are not received. The present teachings disclose methods that prevent retransmissions of these packets as the higher layers, such as, the RLC, will drop the retransmitted packets anyhow.

In some embodiments, a receiver cannot indicate whether a retransmission of packets is required or not, as the receiver does not know the content and the flow being carried in the packets or physical burst. Furthermore, a Medium Access Control (MAC) Protocol Data Unit (PDU) or transport block in a 4G-LTE based system with HARQ may contain data from multiple flows with different QoS needs. Each of the flows may be mapped to different RLC modes (ACK vs UNACK). Moreover, it is not feasible to enable or disable HARQ for some flows and not other flows based on a simple configuration.

HARQ improves link reliability when a packet is retransmitted. This is especially beneficial for data traffic requiring low rates of packet loss (for example, a Transmission Control Protocol (TCP) flow). However, when HARQ is used for delay sensitive flow (for example, a data radio bearer) over an LEO, MEO or GEO satellite link, or any configuration that results in a high retransmission Round Trip Time (RTT), HARQ results in either a long end-to-end delay or poor voice quality.

Figure 3:
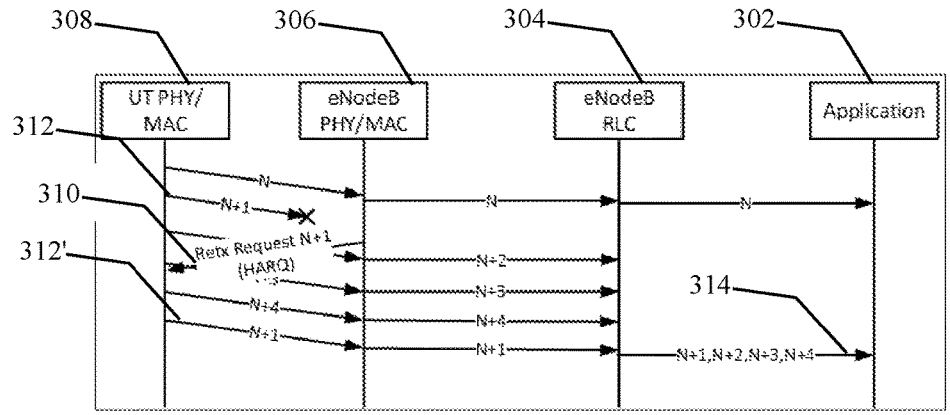
FIG. 3 illustrates a jitter buffer on a receiving side configuration according to various embodiments.
Figure 4:
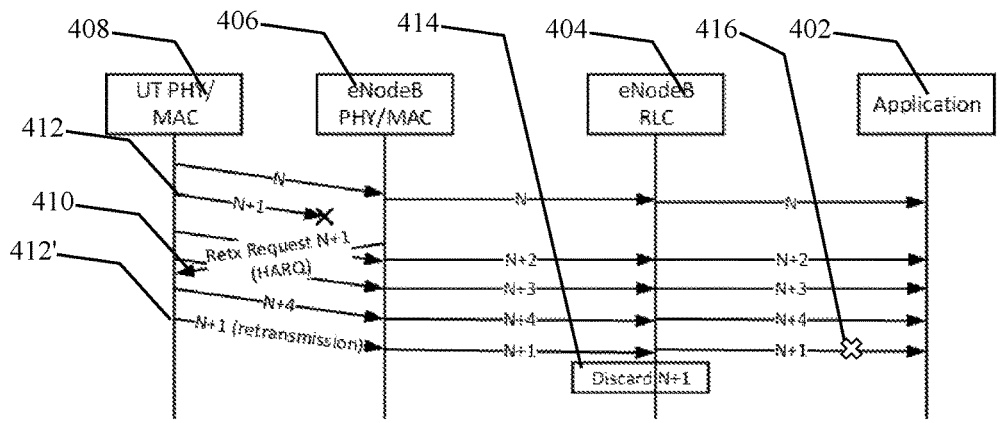
FIG. 4 illustrates a sequence of packet transmissions, a retransmission and a packet getting dropped at the RLC layer according to various embodiments.

In exemplary embodiments, two (2) scenarios are disclosed based on how a vocoder and a jitter buffer on the receiving side is configured and this is shown in FIG. 3. In order to avoid the side effect of HARQ on a long delay for delay sensitive flow, the RLC of the flow is configured such that flow does not wait for the HARQ recovery and drops retransmission packets, in other words, drops any packet not received in sequence. This configuration is controlled by t-reordering time of RLC UNACK per reference [2]. FIG. 4 shows how the sequence of packet transmissions, retransmission and packet getting dropped at RLC.

The present teachings avoid unnecessary retransmission of a physical burst that eventually gets dropped by RLC. The target Frame Error Rate (FER) of the first transmission is a good estimate of the number of retransmissions required. When the retransmissions are unnecessary, the benefits of the present teachings correspond to a gain of up to a Frame Error Rate (FER) of system resources. For example, if the FER for the first transmission is set to $10^{-2}$, 1% of resources will be saved and not used for unwanted retransmissions.

Figure 2:
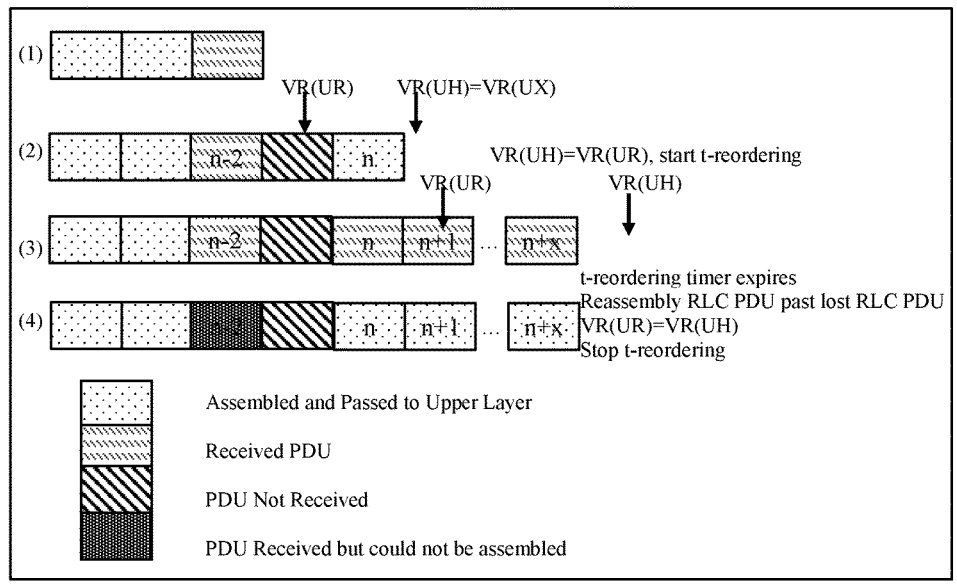

FIG. 1 and FIG. 2 illustrate different state variables per the 3rd Generation Partnership Project (3GPP) specification for a Radio Link Control (RLC) Unacknowledged mode.

FIG. 1 illustrates the impact of a packet loss on RLC reassembly and the resulting delay impact. FIG. 1 is based on the description of RLC reassembly per section 5.1.2 of reference [2]. Stage (1) of FIG. 1 and FIG. 2 illustrates arrival of an RLC block. Stage (2) of FIG. 1 and FIG. 2 illustrates how some of the RLC reassembly variables may be updated as a result of receiving an out of sequence RLC block, for example, due to packet loss over a medium, such as air. In stage (2) RLC blocks n−2, n, n+1 . . . are received, while RLC block n−1 is lost.

An RLC packet n received after the packet loss (packet n−1 was lost) cannot be reassembled or passed to an upper layer until packet n−1 is successfully received (after retransmission of at least RTT from the first transmission). This is illustrated in stages (3) and (4) of FIG. 1. If retransmission is received prior to t-reordering time expiry, reassembly is attempted for packets past packet n−1 per stage (4) of FIG. 1. If retransmission is not received and t-reordering time expires, reassembly is attempted for packets past (n−1) per stage (4) of FIG. 2. Therefore, when a packet loss is experienced, an RLC reassembly attempt occurs for a minimum duration of (number of HARQ Retransmission *RTT, t-reordering) from the time the packet loss occurs (t-reordering starts only when a packet loss is detected by RLC because of the out of sequence reception). Furthermore, this packet delivery delay is about a Gateway-User Terminal (UT) RTT when the t-reordering is configured at a value greater than the Gateway-UT RTT and assuming that one (1) HARQ retransmission is sufficient.

In exemplary embodiments, the VoIP radio bearer may be carrying multiple VoIP traffic sessions. For example, the satellite system may be carrying backhaul traffic and providing an S1 interface between an eNodeB and EPC. With this setup, all VoIP sessions are impacted. Given the delay sensitivity of VoIP flows, in some embodiments, t-reordering is set to 0 (reordering disabled) and reassembly is always attempted when new packets are received.

When t-reordering is disabled, the HARQ procedure is still the same and may result in packet retransmission and RLC block recovery, but these packets will be discarded by RLC as the RLC sequence number will be outside of the allowed reordering window (occurrence of this corresponds to the frame error rate). This behavior results in unnecessary packet retransmission over the air that is eventually dropped.

In the present teachings, unnecessary retransmissions are avoided by instructing the HARQ process not to retransmit packets in case of negative HARQ feedback if the buffer is only carrying data of an RLC block (RB) with the t-reordering set to 0. In exemplary embodiments, t-reordering is set to 0 for retransmission from the eNodeB toward the UT. In exemplary embodiments, the eNodeB may be a satellite gateway.

Figure 5:
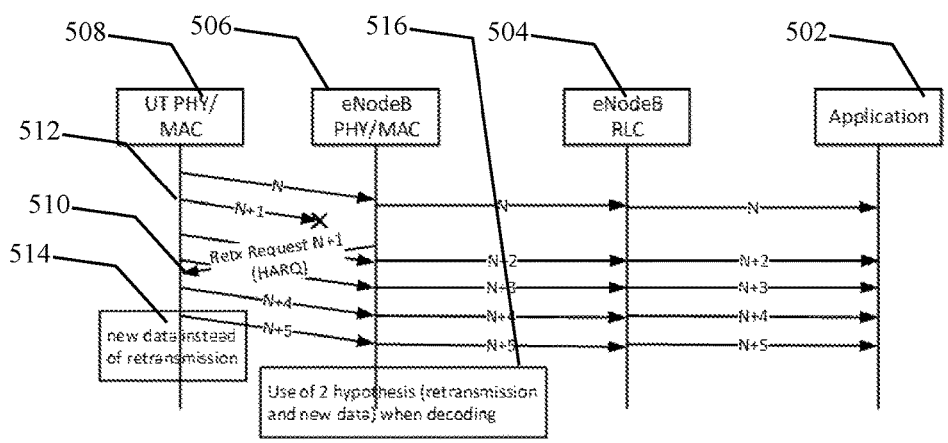
FIG. 5 illustrates a request for retransmission and a new data transmission (overturning) instead of retransmission according to various embodiments.

In some embodiments, transmission from the UT toward the eNodeB is handled differently as a UT's decision to transmit new or retransmit upon packet loss is made by the eNodeB and sent to the UT in the grant. In some embodiments, the UT is allowed to send new data (instead of retransmission of the HARQ buffer) even when it was instructed to retransmit, for example, by the New Data Indicator (NDI) bit in the grant. The UT may override the eNodeB's decision when the HARQ buffer is only carrying data of an RB with the t-reordering set to 0 (conventionally t-reordering applies for a downlink packet, but the parameter may also be used to deduce an eNodeB's treatment on the uplink for the same RB). In the present teachings, when the UT overrides an eNodeB's grant to retransmit and transmits new data instead, the UT may communicate this decision by, for example, overloading some other parameters. In some embodiments, the UT may use parameters similar to the transmission of a Channel Quality Indicator (CQI) on PUSCH (control and data multiplexing) with a reserved value (see section 16.4 of reference [3], and section 5.2.2.6 and section 5.2.2.7 of reference [5]). The UT may not override this decision on a subframe that is assigned to carry a CQI report unless a reserved value is used to indicate that the CQI is not a channel report but an indication that the transmission carries new data and not a retransmission of the HARQ buffer as requested by the eNodeB. This sequence of packet transmission, request for retransmission and UT new data transmission (overturning) is illustrated in FIG. 5.

Given the above, when the eNodeB processes a subframe that corresponds to an uplink grant which requested a retransmission, the eNodeB may process the received burst per various embodiments. In some embodiments, the eNodeB may assume that the received burst is a retransmission (retransmission embodiment) and the eNodeB may combine the burst with the current buffer and attempt to decode the current buffer. In some embodiments, the eNodeB may assume that the UT is using the reserved value in the CQI control portion (new data transmission embodiment). In the CQI embodiment, the eNodeB checks the reserved value in the CQI control portion to determine if the UT indicated whether the UT sent new or retransmit data in the burst. When new data is indicated, the eNodeB may flush and/or replace the previous buffer with the new transmission before decoding.

In some embodiments, the UT doesn't send the control portion to indicate that this a new transmission (overturning eNodeB request for retransmission of the HARQ buffer). In this scenario, the eNodeB processes the received uplink transmission again with 2 hypothesis, the first being the same as before (retransmission hypothesis) and second (new data transmission hypothesis), but without the control portion. Whichever hypothesis passes CRC is declared to be the correct one. This alternative method relies only on CRC to decide which hypothesis is correct, whereas the prior one, the control portion provides a good indication that the UT overturned eNodeB request and sent a new transmission.

UM RLC State Variables as described in reference [2] are shown here to assist in the presentation of FIG. 1 and FIG. 2

In exemplary embodiments, each transmitting UM RLC entity may maintain the variable VT(US). The VT(US) state variable holds the value of a Sequence Number (SN) to be assigned for the next newly generated UMD PDU. It may be initially set to 0, and updated whenever the UM RLC entity delivers a UMD PDU with SN=VT(US). Each receiving UM RLC entity may maintain the following state variables:
  a) VR(UR)—UM receive state variable. This state variable holds the value of the SN of the earliest UMD PDU that is still considered for reordering. It may be initially set to 0.
  b) VR(UX)—UM t-Reordering state variable. This state variable holds the value of the SN following the SN of the UMD PDU which triggered t-Reordering.
  c) VR(UH)—UM highest received state variable. This state variable holds the value of the SN following the SN of the UMD PDU with the highest SN among received UMD PDUs, and it serves as the higher edge of the reordering window. In some embodiments, a reordering feature in the RLC layer may be disabled by setting the reordering window to zero, and enabled by setting the reordering window to a non-zero value. In some embodiments, the reordering window may be initially set to 0.

FIG. 3 illustrates a jitter buffer on a receiving side configuration according to various embodiments.

FIG. 3 illustrates the impact on, for example, on the application layer, when the t-reordering timer is sufficient to accommodate a retransmission. An RLC layer 304 on behalf of an application 302, for example, a vocoder, may request a retransmission of packet N+1 312 via HARQ 310 over the physical layer 306 from a sender 308. As such, the RLC layer 304 may receive packets N+2, . . . , N+4 while waiting for a retransmission of N+1 312' to arrive. The RLC layer 304 may either discard packets N+1, . . . , N+4 when a retransmission of the packet N+1 312' is not received within the jitter buffer or reordering window and invoke error concealment, or the RLC forwards packets N+1, . . . , N+4 314 after processing the retransmission of N+1 312' when the retransmission of the packet N+1 is received within a jitter buffer (not shown; jitter buffer is usually provided in the application 302) or reordering window of the RLC layer 304. In some embodiments, the Application 302 may set a longer reordering window of the RLC layer 304 to accommodate retransmissions, thus resulting in a longer increased end-to-end delay.

FIG. 4 illustrates a sequence of packet transmissions, a retransmission and a packet getting dropped at the RLC layer according to various embodiments.

FIG. 4 illustrates the impact on the application layer when the t-reordering timer is set to 0 to prevent delay due to HARQ retransmission. An RLC layer 404 on behalf of an application 402, for example, a vocoder, may request a retransmission of packet N+1 412 via HARQ 410 over the physical layer 406 from a sender 408. HARQ 410 over the physical layer 406 results in a packet retransmission for packet N+1 412' (the physical layer 406 is not cognizant of the t-reordering being set to 0 in the RLC layer 404), which retransmission packet 412' gets dropped at the RLC layer 404 as the retransmission packet 412' is received out of the receive window set by t-reordering. However, the HARQ 410 retransmission at the physical layer 406 consumes unnecessary resources like bandwidth. The RLC layer 404 forwards packets N, N+2, . . . , N+4 to the Application 402 without waiting for N+1 412. In some embodiments, the application 402 invokes error concealment for the one missing packet 412. In some embodiments, the RLC layer 404 may discard retransmission N+1 412' per 414 and packet N+1 is not forwarded to the Application 402 per 416. By forwarding packets N, N+2, . . . , N+4 to the Application 402 without waiting for N+1 412, the delay impact on the Application 402 is minimized.

FIG. 5 illustrates a request for retransmission and a new data transmission (overturning) instead of retransmission according to various embodiments.

FIG. 5 shows the impact on the application layer when the t-reordering timer is set to 0 to prevent delay due to HARQ retransmission. An Application 502, for example, a vocoder, may request a retransmission of packet N+1 512 via HARQ 510 over the physical layer 506 from a sender 508. HARQ 510 over the physical layer 506 may result in a new data packet N+5 514 (the physical layer 508 may be cognizant of the t-reordering being set to 0 in the RLC layer 504). The RLC layer 504 forwards packets N, N+2, . . . , N+4 to the Application 502 without waiting for N+1 512. In some embodiments, the application 502 invokes error concealment for the one missing packet 512. In some embodiments, the RLC layer 504 may determine whether N+5 514 is a new packet based on various embodiments. HARQ 510 should result in packet retransmission request, but the physical layer 510, for example, in a UT, sends new data as packet N+5 514 rather than retransmitting packet N+1. The eNodeB PHY 506 may determine whether a packet N+5 at 516 is a retransmission packet or new packet.

Figure 6:
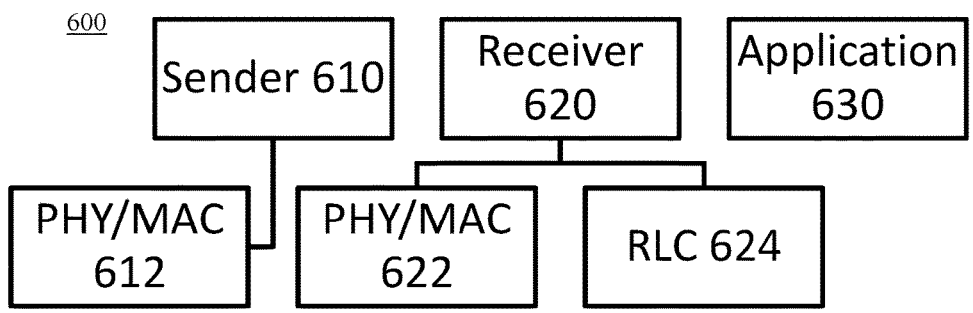
FIG. 6 illustrates an exemplary system to reduce retransmission of packets by a sender according to various embodiments.

FIG. 6 illustrates an exemplary system to reduce retransmission of packets by a sender according to various embodiments.

A system 600 may include a sender 610, a receiver 620 and an application 630. The sender 610 may include a physical transport layer 612. The receiver 620 may include physical transport layer 622 and a radio link control 624. The physical transport layer 612 of the sender 612 may be networked with the physical transport layer 622 of the receiver 620. The physical transport layer 612 and physical transport layer 622 of the receiver 620 may provide for retransmission of packets received with errors using, for example, HARQ. Layers (not shown) above the physical transport layer 612 and the physical transport layer 622 may provide support for flows. In some embodiments, the receiver 620 and the application 630 may be housed together. In some embodiments, the receiver 620, the sender 610 and the abolition 630 maybe house together.

Figure 7:
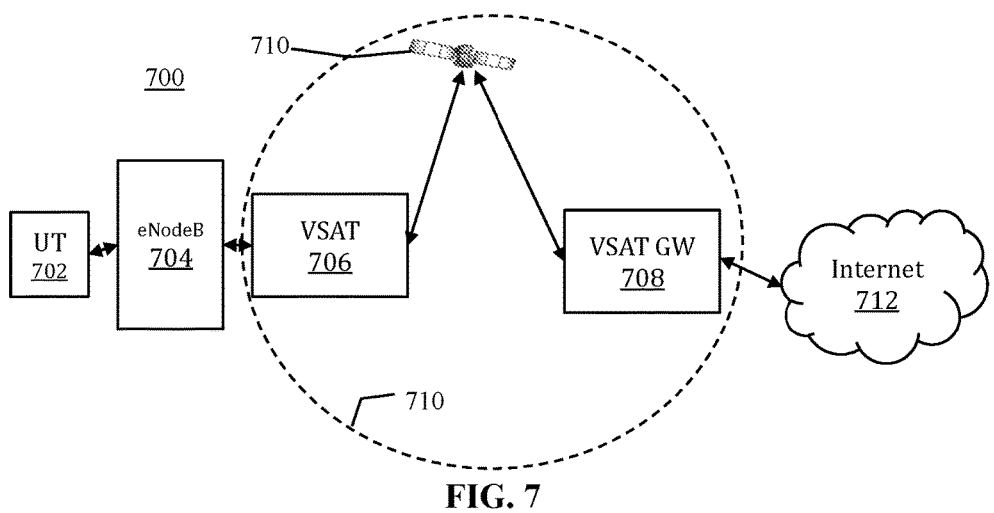
FIG. 7 illustrates an exemplary communication system to reduce retransmission of packets by a sender according to various embodiments.

FIG. 7 illustrates an exemplary communication system to reduce retransmission of packets by a sender according to various embodiments.

FIG. 7 illustrates a communication system 700 to reduce retransmission of packets by a sender. The communication system 700 may include a user terminal (UT) 702, an eNodeB 704, a very small aperture terminal (VSAT), a satellite 710, a VSAT Gateway 708 and a communications network 712. In exemplary embodiments, the present teachings can be applied to non-terrestrial communication links of the communication system 700. In some embodiments, the present teachings may be applied where an RLC layer is present.

In some embodiments, a network link between the UT 702 and the eNodeB 704 may be a radio link. As such, the present teachings can be applied to communications between the UT 702 and the eNodeB 704. In some embodiments, a network link between the VSAT 706 and the VSAT Gateway 708 may use a radio link. As such, the present teachings may be applied to communications between the VSAT 706 and the VSAT Gateway 708.

Figure 8:
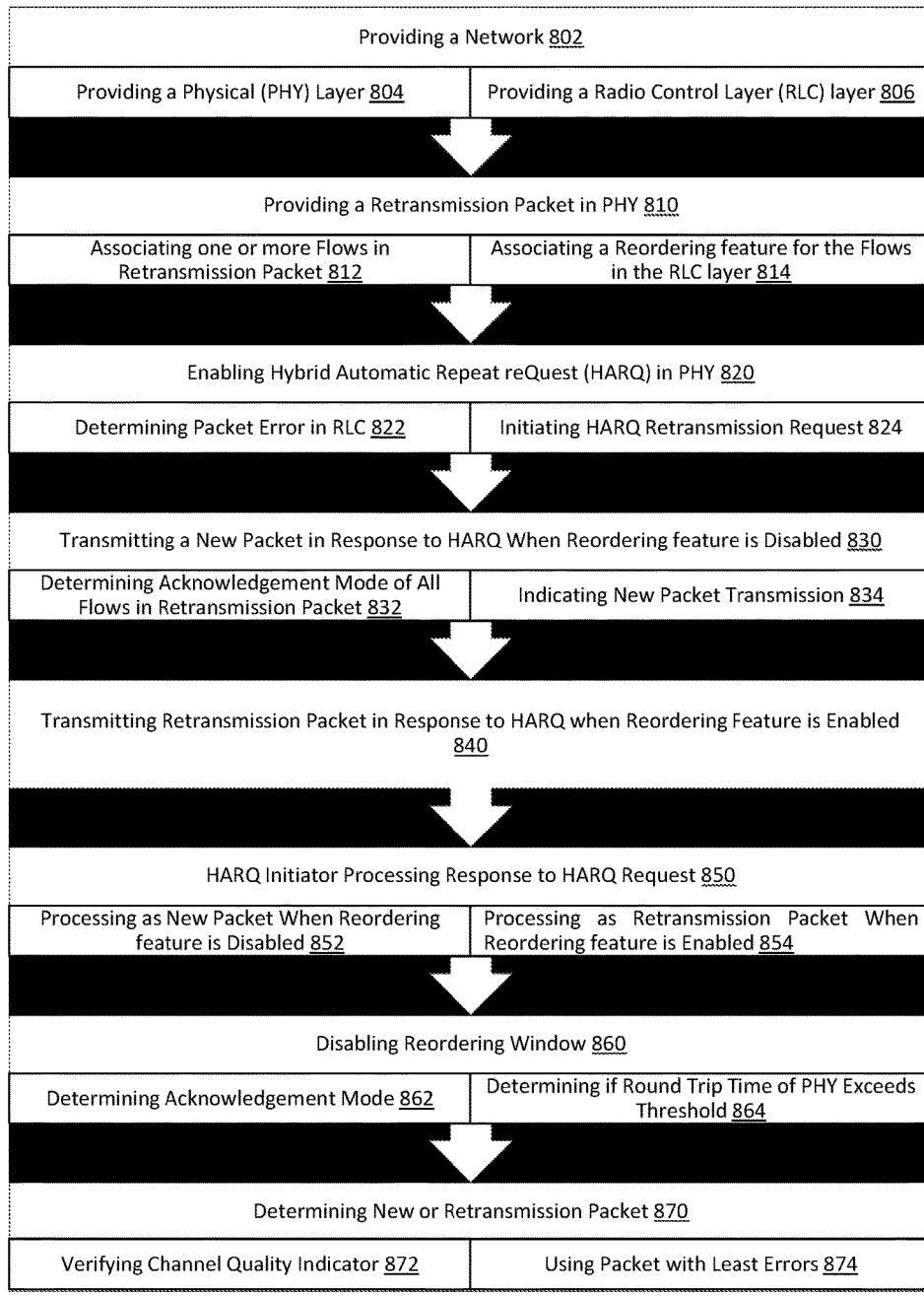
FIG. 8 illustrates a flowchart of an exemplary method for reducing retransmission of packets by a sender according to various embodiments.

FIG. 8 illustrates a flowchart of an exemplary method for reducing retransmission of packets by a sender according to various embodiments.

The present teachings provide a method 800 for reducing retransmission of packets by a sender, for example, in a User Terminal (UT), an eNB, a VSAT, a VSAT GW or the like. The method 800 includes operation 802 for providing a network including providing a Physical (PHY) Layer 804 and providing a Radio Link Control (RLC) layer 806. The PHY layer 804 may include operation 810 for providing a retransmission packet in the PHY layer, for example, by storing and retransmitting the packet for a desired time. The PHY layer 804 may include operation 812 for associating one or more flows in a retransmission packet. The PHY layer 804 may include operation 814 for associating a reordering timer, window or feature for each of the flows in the RLC layer.

The method 800 may include operation 820 for enabling Hybrid Automatic Repeat reQuest (HARQ) in PHY layer. The method 800 may include operation 822 for determining a packet loss in the RLC. The method 800 may include operation 824 for initiating a HARQ retransmission request. In operation 824, the HARQ request may be initiated by a receiver, for example, receiver 620 FIG. 6.

The method 800 may include operation 830 for transmitting a new packet in response to the HARQ request when the associated reordering feature is disabled. The method 800 may include operation 832 for determining an acknowledgement mode of the one or more flows in the retransmission packet. The method 800 may include operation 834 for indicating a new packet transmission. The method 800 may include operation 840 for transmitting a retransmission packet, for example, by a sender 610 of FIG. 6, in response to the HARQ request when the reordering feature is enabled.

The method 800 may include operation 850 where the HARQ initiator, for example, the receiver 620 of FIG. 6, processes a response to the HARQ request. The operation 850 may include operation 852 for processing a retransmitted packet as a new packet when the reordering feature is disabled. The operation 850 may include operation 854 for processing a retransmitted packet as a retransmission packet when reordering feature is enabled.

In some embodiments, the method 800 may include operation 860 for disabling the reordering feature in the RLC layer. The operation 860 may include operation 862 for determining an acknowledgment mode of the flows in a packet. The operation 860 may include operation 864 for determining if a round trip time of the PHY exceeds a threshold.

In some embodiments, the method 800 may include operation 870 for determining whether a retransmitted packet includes a new or retransmission packet. The method 800 may include operation 872 for verifying a channel quality indicator to determine if the received packet was a new packet or a retransmission packet. The method 800 may include operation 874 for using a packet with least errors by, for example computing the error indicator for the original error packet and the newly received packet in response to the HARQ request.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

We claim as our invention:

1. A method for reducing retransmission of packets by a sender, the method comprising:
   providing a network comprising a physical layer, a medium access control (MAC) layer and a Radio Link Control (RLC) layer;
   providing a retransmission packet in the physical layer, wherein the retransmission packet comprises a flow having a reordering feature in the RLC layer;
   enabling Hybrid Automatic Repeat reQuest (HARQ) in the physical layer and the MAC layer;
   receiving a HARQ request for a retransmission; and
   transmitting a new packet with the physical layer in response to the HARQ request, when the reordering feature for the flow in the retransmission packet is disabled; and
   disabling the reordering feature when the flow is configured to operate in an unacknowledged mode and a portion of the physical layer uses a satellite link.

2. The method of claim 1, wherein the flow comprises a plurality of flows in the retransmission packet, and the transmitting further comprises determining that the reordering feature for all the plurality of flows in the retransmission packet are disabled.

3. The method of claim 1, wherein the transmitting comprises setting a Channel Quality Indicator (CQI) on PUSCH with a reserved value to indicate a transmission of the new packet.

4. The method of claim 3, further comprising receiving the new packet; and decoding the new packet as new data when CQI on PUSCH comprises the reserved value.

5. The method of claim 1, further comprising:
   receiving the new packet in response to the HARQ request;
   cycle redundancy checking whether there is an error in the received new packet; and
   accepting the new packet when there is no error.

6. The method of claim 1, further comprising setting an unacknowledged mode for the flow, and wherein the transmitting comprises determining that the unacknowledged mode is set for the flow in the retransmission packet.

7. A method for reducing retransmission of packets by a sender, the method comprising:
   providing a network comprising a physical layer, a medium access control (MAC) layer and a Radio Link Control (RLC) layer;
   providing a retransmission packet in the physical layer, wherein the retransmission packet comprises a flow having a reordering feature in the RLC layer;
   enabling Hybrid Automatic Repeat reQuest (HARQ) in the physical layer and the MAC layer;
   receiving a HARQ request for a retransmission; and
   transmitting a new packet with the physical layer in response to the HARQ request, when the reordering feature for the flow in the retransmission packet is disabled; and
   disabling the reordering feature when the flow is configured to operate in an unacknowledged mode and a portion of the physical layer uses a High Altitude Platform (HAP) link.

8. A system to reduce retransmission of packets by a sender, the system comprising:
   a network comprising a physical layer, a medium access control (MAC) layer, a sender, and a receiver, wherein the receiver comprises a Radio Link Control (RLC) layer; and
   a retransmission packet in the physical layer, wherein the retransmission packet comprises a flow having a reordering feature in the RLC layer;
   wherein a Hybrid Automatic Repeat reQuest (HARQ) is enabled in the physical layer and the MAC layer,
   a HARQ request for a retransmission is received by the sender, and
   the sender sends a new packet with the physical layer in response to the HARQ request, when the reordering feature for the flow in the retransmission packet is disabled,
   wherein the RLC layer disables the reordering feature when the flow is configured to operate in an unacknowledged mode and a portion of the physical layer uses a satellite link.

9. The system of claim 8, wherein the flow comprises a plurality of flows in the retransmission packet, and the sender determines that the reordering feature for all the plurality of flows in the retransmission packet are disabled.

10. The system of claim 8, wherein the sender sets a Channel Quality Indicator (CQI) on PUSCH with a reserved value to indicate a transmission of the new packet.

11. The system of claim 10, wherein the receiver receives the new packet and decodes the new packet as new data when CQI on PUSCH comprises the reserved value.

12. The system of claim 8, wherein
   the receiver receives the new packet in response to the HARQ request,
   the receiver cycle redundancy checks whether there is an error in the received new packet; and
   the receiver accepts the new packet when there is no error.

13. The system of claim 8, wherein the receiver sets an unacknowledged mode for the flow, and wherein the sender determines that the unacknowledged mode is set for the flow in the retransmission packet.

14. A system to reduce retransmission of packets by a sender, the system comprising:
- a network comprising a physical layer, a medium access control (MAC) layer, a sender, and a receiver, wherein the receiver comprises a Radio Link Control (RLC) layer; and
- a retransmission packet in the physical layer, wherein the retransmission packet comprises a flow having a reordering feature in the RLC layer;
- wherein a Hybrid Automatic Repeat reQuest (HARQ) is enabled in the physical layer and the MAC layer,
- a HARQ request for a retransmission is received by the sender, and
- the sender sends a new packet with the physical layer in response to the HARQ request, when the reordering feature for the flow in the retransmission packet is disabled,
- wherein the RLC layer disables the reordering feature when the flow is configured to operate in an unacknowledged mode and a portion of the physical layer uses a High Altitude Platform (HAP) link.

* * * * *